Figure 1:
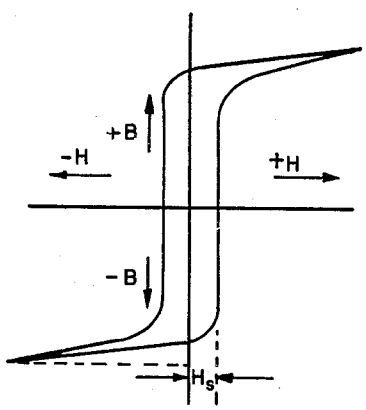

June 10, 1958   R. T. LOEWE   2,838,688
SATURABLE PHASE DETECTOR
Filed Oct. 22, 1956   4 Sheets-Sheet 1

INVENTOR.
RICHARD T. LOEWE
BY *Allan Rothenberg*
ATTORNEY

June 10, 1958  R. T. LOEWE  2,838,688
SATURABLE PHASE DETECTOR
Filed Oct. 22, 1956  4 Sheets-Sheet 2

INVENTOR.
RICHARD T. LOEWE
BY *Allen Rothenberg*

ATTORNEY

June 10, 1958

R. T. LOEWE 2,838,688

SATURABLE PHASE DETECTOR

Filed Oct. 22, 1956

4 Sheets-Sheet 4

INVENTOR.
RICHARD T. LOEWE

BY Allan Rothenberg

ATTORNEY

United States Patent Office 2,838,688
Patented June 10, 1958

2,838,688

SATURABLE PHASE DETECTOR

Richard T. Loewe, Whittier, Calif., assignor to North American Aviation, Inc.

Application October 22, 1956, Serial No. 617,294

12 Claims. (Cl. 307—88)

This invention relates to saturable phase detectors and more particularly to a phase detector or phase demodulator which is based on the operation of a saturable device which is driven from a condition far into saturation to a condition of nonsaturation.

The present invention is based on the principle of operation of a saturable device as particularly described in applicant's co-pending application for Saturable Comparator, Serial No. 609,713, filed September 13, 1956. As described in said co-pending application, a saturable device such as a ferroelectric element or a magnetic core is driven far into the saturated region thereof considerably beyond nonsaturation. The order of magnitude of the driving signal is chosen such that the ratio of the minimum driving force which is required to saturate the device to the maximum driving force applied thereto is on the order of or smaller than the allowable error of the circuit. Thus, the unsaturated region appears as a sharp discontinuity to the applied driving forces. This discontinuity may be utilized to sense when the sum of the applied driving forces passes through zero since an output pulse is obtained when the total driving force passes through the nonsaturated state of the device. There is, therefore, provided a means for zero comparison which can be used in a feedback loop or as a straight forward comparator, several examples of which are disclosed in the above-mentioned co-pending application. This zero comparison point is an absolute zero which does not change or drift significantly due to external influences such as temperature, filament voltage, or humidity.

The present invention will provide an output signal which is continuously proportional to the value of an input signal at a particular phase of a reference phase signal. The reference signal is fed to a saturable device which is driven far into saturation by the peaks of the reference and a series of reference pulses are induced as the reference signal passes through zero. The reference signal together with the input signal is applied to a second similar saturable device whereby the combined signals produce a net driving force which drives the second device from a condition far into saturation through the unsaturated region thereof to produce a train of output pulses which occur as the net driving force passes through zero. There is applied to the second saturable device a relatively steady driving force of a magnitude and polarity which in effect shifts the phase of zero crossing of the net driving force applied to the second device by an amount which produces time coincidence of the output pulses from the two devices. When the output pulses occur simultaneously, the steady driving force applied to the second device is of a polarity and magnitude indicative of the desired relation.

It is an object of this invention to provide an improved phase detector.

Still another object of this invention is the operation of a saturable device as a phase detector operable over a complete 360° and providing an output of both positive and negative polarity.

Figure 2:
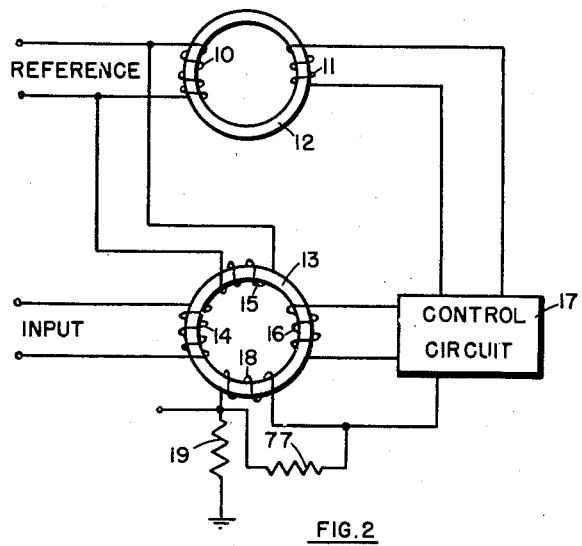
Figure 3:
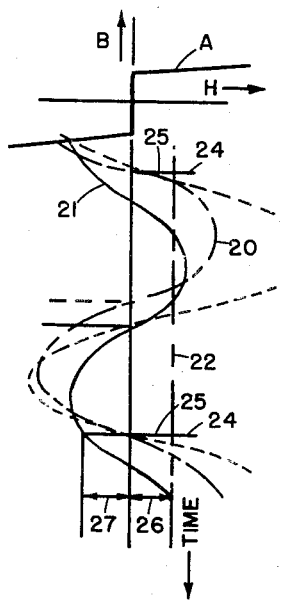
Figure 4:
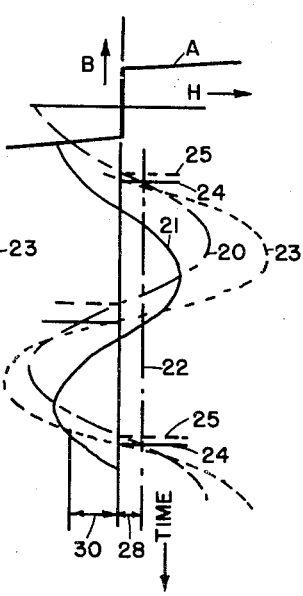
Figure 5:
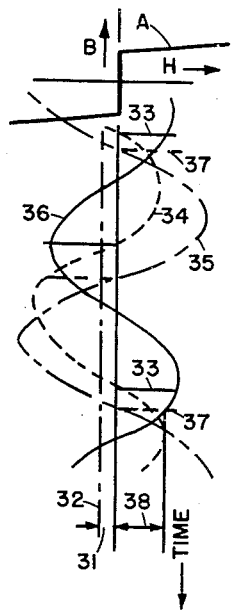
Figure 6:
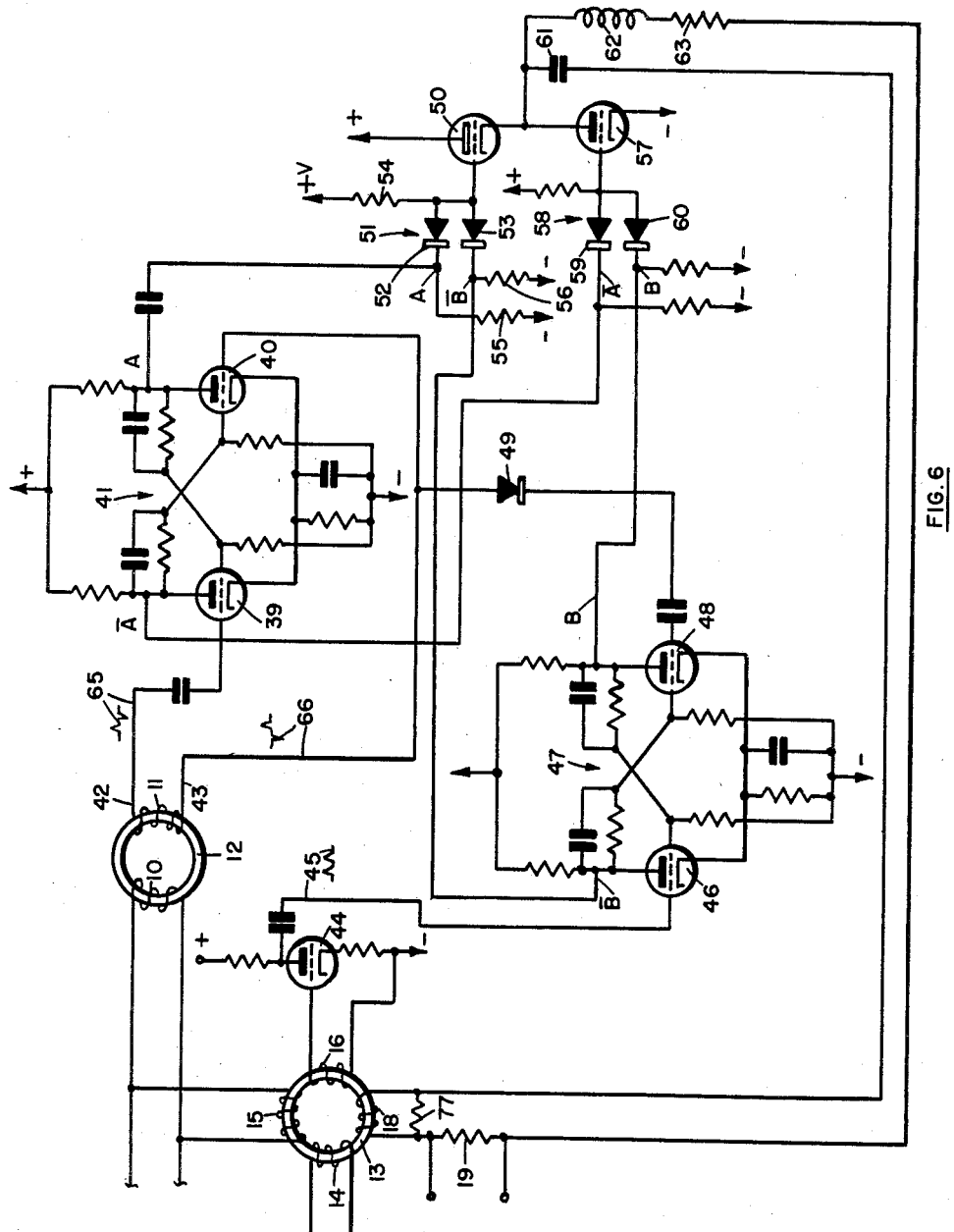
Figure 7:
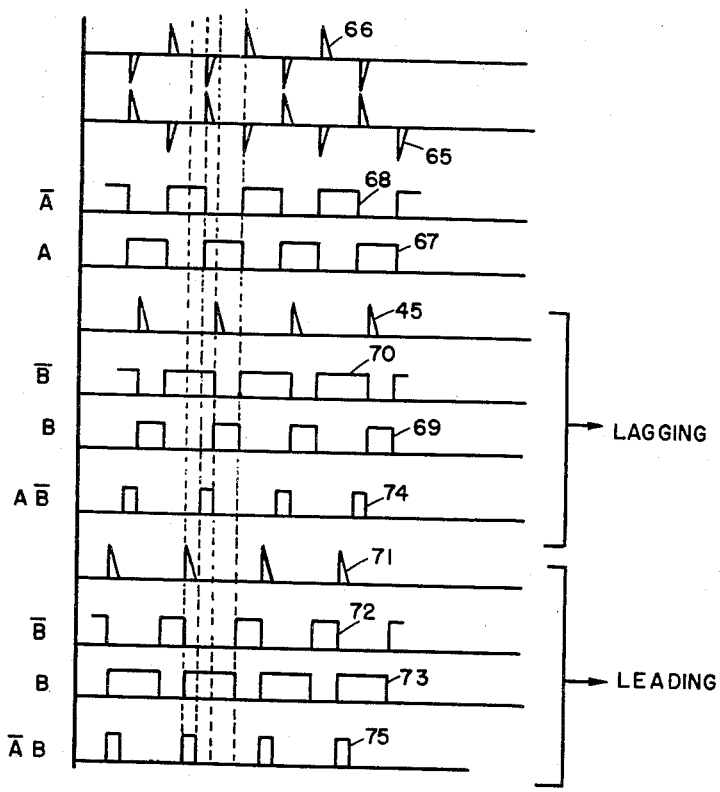

Other objects of invention will become apparent from the following description taken in connection with the accompanying drawings, in which Fig. 1 is the hysteresis curve of a magnetic element which is suitable to the practice of this invention;

Fig. 2 is a schematic representation of the basic functional components of the invention;

Figs. 3, 4 and 5 graphically illustrate the operation of the circuit of Fig. 2;

Fig. 6 is a circuit diagram showing one method of instrumentation of the apparatus functionally shown in Fig. 2;

And Fig. 7 comprises a graph illustrating certain simultaneous wave forms of the circuit of Fig. 6.

Shown in Fig. 1 is the hysteresis curve, the variation of flux density B with driving force H of a magnetic material such as one of the high permeability nickel-iron alloys which have a high ratio of residual flux density to the flux density at saturation. A material such as Deltamax, manufactured by the Allegheny Ludlum Steel Corporation, or Supermalloy has characteristics adapted to the practice of this invention. As indicated, the curve is substantially rectangular with vertical sides, sharp knees and a substantially flat top indicative of a high ratio of residual flux density to the flux density at saturation. A minimum magnetomotive forme $H_s$ will drive this magnetic material into saturation. In accordance with the principles of the present invention, the maximum driving force applied to the magnetic material is of a magnitude many times greater than $H_s$ such that the ratio of the width of the nonsaturated region to the magnetomotive forces applied to the material is of a magnitude on the order of the allowable error of the circuit. For example, a peak driving force on the order of one hundred times $H_s$ would be provided to obtain operation with an allowable error of one percent. With such relatively large driving forces applied to the saturable magnetic device, the width of the nonsaturated region is negligible and the hysteresis curve appears substantially as the curve A of Figs. 3, 4 and 5.

As shown in Fig. 2, a reference phase signal is fed to a winding 10 on a saturable magnetic core 12 to produce an alternating driving force in the core which varies from a peak magnitude considerably greater than the magnitude of the minimum force required to saturate the device through zero to a peak magnitude of opposite polarity. At each zero crossover point, the point at which the reference signal and the applied magnetomotive force pass through zero, there is induced in sensing winding 11 of the core 12 a sharp reference pulse. Assuming a positive pulse in winding 11 for each positive going crossing of the reference signal, there appears in the winding 11 a train of positive reference pulses each of which occurs at the positive going zero crossover point of the reference phase signal. Thus, the time at which the positive pulse in winding 11 occurs is the reference time at which the amplitude of the input signal is desired to be indicated. A second magnetic core 13 has applied to input windings 14 and 15 thereon, the input signal of unknown phase and magnitude and the reference signal, respectively, each of which will apply to the core 13 an alternating polarity magnetomotive force of a peak magnitude which is considerably greater than the magnitude of the minimum magnetomotive force required to drive the core 13 into saturation in accordance with the principles explained above. A sensing winding 16 on core 13 has induced therein an output pulse for each zero crossing of the total magnetomotive force applied to core 13. The pulses from windings 11 and 16 are fed to a control circuit 17 which in turn feeds a relatively steady signal through feedback winding 18 and output resistor 19 as more particularly described hereinafter. Thus the core 13 combines or sums the magnetomotive forces of the input, reference and feedback signals.

Assuming that the reference signal is represented by $$i_R = I_R \sin \omega t \quad (1)$$

and the input signal is represented by $$i_i = I_i \sin(\omega t + \theta) \quad (2)$$

where $\theta$ is an unknown phase difference, then the total magnetomotive force, $H_T$, applied to saturable core 13 is $$H_T = N_R I_R \sin \omega t + N_i I_i \sin(\omega t + \theta) - N_0 i_0 \quad (3)$$

where $N_R$ is the number of turns of winding 15, $N_i$ is the number of turns of winding 14, $N_0$ is the number of turns of winding 18 and $i_0$ is the feedback current through winding 18 and resistor 19.

Due to the order of magnitudes of the applied magnetomotive forces, the nonsaturated region of the characteristic hysteresis curve of core 13 is negligible as compared to the value of the forces applied to the core and therefore positive and negative pulses will be induced in winding 16 at the positive and negative going crossover points of the total magnetomotive forces applied to core 13.

Assume positive pulses are produced in windings 11 and 16 for corresponding positive going crossover points. If the positive pulses from windings 11 and 16 occur simultaneously, the following relations exist:

$$\omega t = 0 \quad (4)$$

$$0 = I_R \sin \omega t \quad (5)$$

(in core 12)

$$0 = N_R I_R \sin \omega t + N_i I_i \sin(\omega t + \theta) - N_0 i_0 \quad (6)$$

(in core 13)

from which it may be seen that $$i_0 = \frac{N_i}{N_0} I_i \sin \theta \quad (7)$$

It will be seen then that the current through the feedback winding 18 is directly proportional to the amplitude of the input signal at the chosen phase of the reference signal, when $\omega t = $ zero, and further, that the phase difference $\theta$ itself may be simply obtained from the value and polarity of the feedback current $i_0$ if $I_i$ and $$\frac{N_i}{N_0}$$

are known. Thus, the function of the control circuit 17 is to provide a feedback signal through winding 18 which will cause the positive pulses from windings 11 and 16 to occur simultaneously. When this condition is met the magnitude and polarity of the feedback current is directly representative of the magnitude and polarity of the input signal at the reference time. As may be seen from Equation 7, amplification may be simply obtained by choosing a turns ratio $$\frac{N_i}{N_0}$$

greater than unity or by dividing to get $i_0$. The division of $i_0$ may be effected by providing resistor 77 connected across winding 18.

Indicated in Fig. 3 are the wave forms of the magnetomotive forces at the null condition where the reference and output positive pulses occur in coincidence. The core 13 in effect sums the magnetomotive reference force 20 (from winding 15), the input force 21 (from winding 14), and the output or feedback force 22 (from winding 18) to produce a total magnetizing force 23 in the core which passes through zero in the positive going direction to produce positive output pulses 24 in time coincidence with the positive reference pulses 25 produced as the reference signal of the driving force in core 12 passes through zero in the positive going direction. Thus, the magnitude 26 of the magnetomotive force component 22 produced by winding 18 is equal and opposite to the magnetomotive force 27 of the input signal 21 at the positive going zero crossover point of the reference signal 20. If, as shown in Fig. 4, the feedback force 22 generated by coil 18 is zero or of too small a positive value for the phase relation shown, the output pulses 24 produced by the positive going zero crossover of the resultant 23 (the sum of reference force 20, input force 21, and the feedback force 22) will lag the positive pulses 25 produced by the positive zero crossover of the reference force alone. The control circuitry in this condition will in effect sense the magnitude and polarity of the time difference between pulses 24 and 25 and increase the feedback force 22 in a positive direction to cause the magnitude 28 of the feedback force to approach the magnitude 30 of the input force at the desired reference time.

If, for the phase relations shown in Fig. 5, the value 31 of the feedback force 32 is zero or of a negative magnitude which is not great enough to effect the desired coincidence, the output pulses 33 which occur at positive going zero crossover points of the resultant force 34 (the sum of reference force 35, input force 36 and feedback force 32) will lead the reference pulses 37. Here the output value 31 is smaller than the desired value 38 of the input signal 36 at the positive zero crossover point of reference 35. In this instance the control circuitry 17 will produce a feedback signal through coil 18 of a polarity which will increase the negative value of feedback force 32 to cause the value 31 to be equal to the value 38. Thus, it will be seen that the desired control circuit 17 is such that it will produce a relatively steady or D.-C. type output and feedback signal which has a polarity and magnitude determined by the polarity and magnitude of the phase of the output pulses 33 relative to the phase of the reference pulses 37. The magnitude and polarity of this feedback signal is also directly related to the magnitude and polarity of the phase difference between the input and reference signals. Thus phase demodulation is provided since the output will follow the phase variations of the input signal.

While the disclosed apparatus utilizes saturable elements to perform the dual function of summing of input and reference signals and generating the desired zero crossover pulses thereof, it will be readily appreciated that these functions could be obtained by the use of vacuum tube or transistor circuitry as will be apparent to those skilled in the art.

Shown in Fig. 6 is the circuitry of a control circuit which will provide the desired output through feedback coil 18. The output of this circuit is proportional to the integral or sum of the time between positive pulses. In other words, the successive time intervals are integrated to a point where the feedback force causes the positive pulses from the two cores to occur simultaneously. Elements 10 through 16, 18, 19 and 77 of Fig. 6 may be similar or identical in structure and operation to the same elements shown in the functional diagram of Fig. 2. The pair of tubes 39 and 40, connected as a first bistable multivibrator 41, have the control grids thereof respectively connected to opposite ends of sensing winding 11 on the reference core 12. For the purposes of this discussion, it is assumed that positive going crossings of the reference signal in core 12 will produce a positive pulse on the upper terminal 42 of winding 11 and a negative pulse on the lower terminal 43 thereof. Thus a train of reference pulses 65 appears at point 42 and a train of pulses 66 appears at point 43. These pulse trains produce the square wave 68 at the plate of tube 39 and the square wave 67 at the plate of tube 40 (Fig. 7). The sensing winding 16 on core 13 is so poled that a positive going zero crossover of the resultant magnetomotive force in the core will produce a negative pulse on the side of the winding which is coupled to the grid of normally conducting tube 44 whereby a train of positive output pulses 45 or 71 (depending on the time of zero crossing) appearing at the plate of tube 44 may be fed to the grid of tube 46 of a second bistable multivibrator 47. The grid of a second tube 48 of multivibrator 47 is fed through diode 49 solely with the positive pulses from the end 43 of winding 11 which occur during negative going zero crossovers of the reference signal. Thus there is produced the square wave 70 or 72 at the plate of tube 46 and the square wave 69 or 73 at the plate of tube 48.

Tube 50 is normally cut off by the diode coincidence gate 51 comprising diodes 52 and 53 which normally conduct current from a source of positive potential +V through resistor 54 and resistors 55 and 56, respectively, to maintain the grid of tube 50 below cut off. Similarly, tube 57 which has its cathode connected to a source of negative potential is normally cut off by the diode gate 58 comprising diodes 59 and 60 which function in a manner similar to that described in connection with diodes 52 and 53 to maintain tube 57 normally cut off. If tube 50 is caused to conduct, capacitor 61 will be charged more positively. The discharge current, fed through a filter comprising inductance 62 and resistor 63, output resistor 19, and feedback coil 18 will thus increase in a positive direction. If tube 57 is caused to conduct a negative signal is applied to capacitor 61 whereby the component of discharge current of the capacitor due to conduction of tube 57 will be of negative polarity. The magnitude of the discharge current of the capacitor and therefore of the current through feedback winding 18 is directly related to its total charge which is determined by the previous duration of conduction of tubes 50 and 57 and the discharge current. Conduction of tube 50 will tend to increase the discharge current in the positive direction while conduction of tube 57 will tend to increase the discharge current in the negative direction. Therefore, it is desirable to cause the tube 50 to conduct for a time proportional to the time between output and reference pulses when the output pulse lags the reference pulse, and to cause tube 57 to conduct for time proportional to the time between output and reference pulses when the output pulse leads the reference pulse. This may be effected by feeding a positive signal to the grid of tube 50 for a lagging output pulse and a positive signal to the grid of tube 57 for a leading output pulse. These positive signals are of a duration proportional to the lag or lead time, respectively.

If a signal A such as the positive swing of square wave 67 (Fig. 7) be initiated at the time of the positive reference pulses of train 65, and a signal B, such as the positive swing of square wave 69 or 73, be initiated at the time of the output pulses 45 or 71, then a signal produced by the coincidence of the existence of signal A and the absence of signal B will have a duration equal to the time interval between the reference and output pulses.

If $\bar{A}$ is a signal representing the absence of A, and $\bar{B}$ is a signal representing the absence of B, then a signal $A\bar{B}$ (coincidence of A and $\bar{B}$) such as the pulse 74 is the desired pulse for a lagging output pulse 45, and a signal $\bar{A}B$ such as pulse 75 is the desired pulse for a leading output pulse 71. The disclosed circuitry produces the appropriate signal $A\bar{B}$ or $\bar{A}B$ and generates a positive going feedback signal indicative of the sum of signals $A\bar{B}$ and also generates a negative going feedback signal indicative of the sum of signals $\bar{A}B$. The signals A and B are simultaneously reset at the time of the negative pulses of the reference train 65.

Conduction of the diodes 52, 53, 59 and 60 is terminated by a positive signal pulse applied to the cathodes thereof. Cut off of both diodes of any one gate will introduce a positive signal on the grid of its associated tube. The pulse train 65 from point 42 of winding 11 and the pulse train 66 from point 43 of the winding produce at the plates of the tubes 39 and 40, respectively, the square waves of oppositely polarity 67 and 68 which may be designated as A and $\bar{A}$, respectively. The positive lagging pulses 45 from the plate of tube 44 cause conduction and nonconduction of tubes 46 and 48, respectively, of multivibrator 47, while the positive pulses of pulse train 66 which occur at the negative going zero crossover points of the reference signal are fed to both tubes 48 and 40 to cause conduction of each of these tubes and to concurrently cut off tubes 46 and 39 due to the multivibrator feedback action. Thus, when the output pulses 45 lag the positive going reference pulses of train 65, square wave B designated as 69 in Fig. 7, will appear at the plate of tube 48, and square wave $\bar{B}$ designated as 70 will appear at the plate of tube 46. The positive pulses 45 produce positive and negative swings respectively of waves 69 and 70 while the positive pulses of train 66 will produce the negative and positive going swing of the square waves 69 and 70, respectively. Thus, if A, $\bar{A}$, B and $\bar{B}$, respectively, denote the positive portions of the square waves 67, 68, 69 and 70, respectively, it will be coincidence of the positive swings of signals 67 and 70 applied to diodes 52, 53, respectively, which produces the signal $A\bar{B}$ on the grid of tube 50. The duration of the signal $A\bar{B}$ is equal to the time between positive pulses of train 65 and the output pulses 45 as may be clearly seen from Fig. 7. In this situation, the lagging of pulses 45 relative to the positive going reference pulses, there will be no coincidence of the positive portions of square waves 68 and 69 and thus there is no signal $\bar{A}B$. The signal $\bar{A}B$ appears on the grid of tube 57 only when the output pulses 71 from the plate of tube 44 lead the positive going pulses of reference train 65. With this leading arrangement the signal $\bar{B}$ appears as the square wave 72 at the plate of tube 46 whence it is fed to the diode 53 and the signal B appears as the square wave 73 at the plate of tube 48 whence it is fed to diode 60. The signals A and $\bar{A}$, square waves 67 and 68, respectively, are fed to diodes 52 and 59, respectively, and have the timing thereof determined solely by the reference pulses. With the leading of the output pulses 71 there will be coincidence of the positive portions of signals $\bar{A}$ and B to produce the series of positive pulses 75 at the grid of tube 57. As indicated in Fig. 7, the width of the pulses 75, signal $\bar{A}B$, is equal to the time between the pulses 71 and the positive going pulses of the reference train 65. In this instance, there is no coincidence of positive going portions of square waves 67 and 72 and thus there is no signal $A\bar{B}$. It will be seen then that the described circuitry produces a signal $A\bar{B}$ which appears as the positive pulse 74 on the grid of tube 50 when the output pulse train 45 lags the reference pulse train and that this pulse 74 exists for a time proportional to the time between corresponding output and reference pulses. When the output pulse train 71 leads the positive going reference pulses, the circuitry will produce the signal $\bar{A}B$ as a positive going pulse 75 on the grid of tube 57, and the pulses 75 likewise exist for a time equal to the time between the positive going reference pulses and the output pulses. Since conduction of tube 50 charges the capacitor 61 in one direction and the conduction of tube 57 charges the capacitor in the other direction, it will be seen that the polarity of the capacitor charge due to a capacitor charge increment produced by any pair of corresponding output and positive going reference pulses will be in accordance with the polarity of the phase of the output pulse train relative to the phase of the reference pulse train. That is, a leading output pulse will produce a negative charge increment on the capacitor and a lagging pulse will produce a positive charge increment. This increment, as explained above, is proportional to the time between the corresponding pulses and thus the discharge current of the capacitor will be directly related to the integral or sum of such time intervals between corresponding pulses of the two trains.

While the specifically described embodiment of the control circuit 17 utilizes vacuum tubes, it will readily be apparent to those skilled in the art that the instrumentation of this circuit may equally well be achieved by the use of transistor circuitry in order to obtain decreased size, smaller power requirements, and other well-known advantages of transistors. The coupling may be different from core to core and winding to winding in different cores and windings due to manufacturing tolerances, and thus the nature of the coupling in the unsaturated region of the core where the comparison is made may vary. However, these variations may be compensated for since they do not change significantly after manufacture of the components.

It is also desirable to maintain the coupling between input or reference and sensing windings of any core as low as possible in the saturated state of the core in order to prevent unwanted signals from feeding into the core and to prevent extraneous signals from being produced in the output winding while the core is in its saturated region and to reduce cross coupling between the various inputs. This may be effected for example by physically placing the sensing windings at 90° to the input windings.

If the amplitude of the input signal at the peak of the reference signal rather than at the zero crossover point thereof is desired, it is simply necessary to shift the reference phase by 90°.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A phase detector comprising first and second saturable magnetic cores each having a pair of opposite sense saturated states and a transition state therebetween, each said core being shiftable to a saturated state thereof in response to the application thereto of a driving force of predetermined minimum magnitude, a source of reference signal, a source of input signal, means responsive to said reference signal for applying to said first core an alternating driving force having a maximum magnitude considerably greater than said minimum magnitude, means responsive to shifting of said first core from one of the saturated states thereof for generating a reference pulse, means responsive to said reference and input signals for applying to said second core a pair of alternating driving force components each having a maximum magnitude considerably greater than said minimum magnitude, means responsive to shifting of said second core from one of the saturated states thereof for generating an output pulse, feedback means responsive to said reference and output pulses for varying the net driving force applied to said second core to effect coincidence of said reference and output pulses, and output means coupled with said feedback means.

2. A phase detector comprising a magnetic core having saturated and nonsaturated states, said core being shiftable to said saturated state in response to the application thereto of a driving force having a minimum predetermined magnitude, a source of reference signal, a source of input signal, means response to said signals for applying to said core a driving force which repetitively decreases from a first magnitude considerably greater than said minimum magnitude to a second magnitude less than said minimum magnitude, whereby said core is repetitively shifted from said saturated state, means responsive to the shifting of said core from said saturated state for generating a train of output pulses, means for deriving a train of reference pulses from said reference signal, control means for effecting time coincidence of the pulses of said reference and output trains, and output means coupled with said control means.

3. The detector of claim 2 wherein said control means comprises feedback means responsive to both said output and reference pulses for applying a control driving force to said core to very the time of each shift of state thereof.

4. A phase detector comprising a source of reference signal, a source of input signal, saturable means for deriving from said signals an alternating polarity driving signal representative of the sum of said signals, means for deriving a train of reference pulses from said reference signal, said saturable means including means for deriving a train of output pulses from the swings of said driving signal through zero in a predetermined direction, control means for combining a control signal component with said driving signal to effect coincidence of the time of each said swing through zero with the time of corresponding reference pulses, and output means coupled with said control means.

5. The apparatus of claim 4 wherein said control means comprises means responsive to said reference and output pulses for generating a relatively steady control signal component of a polarity in accordance with the sense of the phase difference between said reference and output pulse trains.

6. A phase detector comprising a source of reference signal, a source of input signal of unknown phase, means for deriving a train of reference pulses each corresponding to a predetermined point of each cycle of said reference signal, means for combining said signals, means for deriving a train of output pulses each of which occurs at a predetermined point of each cycle of said combined signal, control means responsive to the time interval between corresponding pulses of said output and reference trains for adding to said combined signal a relatively steady signal component whereby said time interval is reduced to zero, and output means coupled with said control means.

7. Apparatus for providing an indicating signal representative of the amplitude of an input signal of unknown phase at a predetermined phase of a reference signal, comprising a source of input signal, a source of reference signal, means for generating a reference pulse at a predetermined phase of each cycle of said reference signal, means for combining said input and reference signals, means for generating an output pulse at a predetermined phase of said combined signals, feedback means responsive to the time interval between corresponding reference and output pulses for generating a relatively steady feedback signal, said combining means including means for combining said feedback signal with said reference and input signals, and output means coupled with said feedback means.

8. The apparatus of claim 7 wherein said feedback means comprises means responsive to said output and reference pulses for generating a plurality of feedback pulses each having a width proportional to the time interval between corresponding output and reference pulses, and means responsive to said feedback pulses for generating said relatively steady feedback signal.

9. A phase detector comprising a saturable device having saturated and nonsaturated states, a source of alternating input signal of unknown phase, a source of alternating reference signal, means for generating a train of reference pulses from said reference signal, means responsive to said input and reference signals for applying an alternating driving force to said device whereby said device is repetitively shifted from saturated to nonsaturated state, means responsive to the shifting of said device from said saturated state for generating a train of output pulses, means for generating a feedback signal representative of the integral of the time between output and reference pulses, and means responsive to said feedback signal for applying a relatively steady driving force to said device.

10. A phase detector comprising a saturable device having saturated and nonsaturated states, a source of alternating input signal of unknown phase, a source of alternating reference signal, means for generating a train of reference pulses from said reference signal, means responsive to said input and reference signals for applying an alternating driving force to said device whereby said device is repetitively shifted from saturated to nonsaturated states, means responsive to the shifting of said device from said saturated state for generating a train of output pulses, means for maintaining time coincidence of the pulses of said output train with the pulses of said reference train, and output means coupled with said last mentioned means.

11. A phase detector comprising a saturable magnetic core, a source of alternating input signal of unknown phase, a source of alternating reference signal, means for deriving a training of reference pulses from said reference signal, a pair of input windings on said core respectively coupled with said input and reference sources whereby said core is repetitively shifted from saturation by the combined effect of said windings, sensing means on said core for generating an output pulse for each said shift of said core, a feedback winding on said core, feedback means responsive to said reference and output pulses for generating a train of feedback pulses having a duration proportional to the time between corresponding reference and input pulses and having a polarity in accordance with the polarity of the phase of said output pulses relative to said input pulses, and means responsive to said feedback pulses for feeding to said feedback winding a signal having a magnitude and polarity representative of the phase difference between said input and reference signals.

12. A phase detector comprising first and second saturable magnetic cores, a source of alternating reference signal, a source of alternating input signal, means responsive to said reference signal for applying to said first core an alternating magnetomotive force having a peak magnitude considerably greater than the magnitude of the least magnetomotive force required to saturate said first core, means responsive to said input and reference signals for applying to said second core a combined magnetomotive force having a peak magnitude considerably greater than the magnitude of the least magnetomotive force required to saturate said second core, means for modifying said combined force to effect time coincidence of the zero crossings of the combined forces applied to said first and second cores, said last mentioned means comprising means for applying to said second core a relatively steady magnetomotive force of a magnitude and polarity in accordance with the magnitude and polarity of the phase difference between the forces applied to said first and second cores.

No references cited.

UNITED STATES PATENT OFFICE

CERTIFICATE OF CORRECTION

Patent No. 2,838,688 — June 10, 1958

Richard T. Loewe

It is hereby certified that error appears in the printed specification of the above numbered patent requiring correction and that the said Letters Patent should read as corrected below.

Column 2, line 26, for "forme" read -- force --; column 3, line 60, after "dividing" insert -- down --; column 5, line 63, for "sginal" read -- signal --; column 7, line 67, for "response" read -- responsive --; column 8, line 7, for "very" read -- vary --; column 9, line 18, for "training" read -- train --.

Signed and sealed this 28th day of October 1958.

(SEAL)

Attest:

KARL H. AXLINE
Attesting Officer

ROBERT C. WATSON
Commissioner of Patents